May 1, 1951 K. P. GOODWIN ET AL 2,550,912
ANTIFRICTION BEARING
Filed Aug. 30, 1945

INVENTORS:
KARL P. GOODWIN,
LELAND D. COBB.
BY Romeyn A. Spare
THEIR ATTORNEY.

Patented May 1, 1951

2,550,912

UNITED STATES PATENT OFFICE 2,550,912

ANTIFRICTION BEARING

Karl P. Goodwin, New Bedford, Mass., and Leland D. Cobb, Forestville, Conn., assignors of one-half to Acushnet Process Company, New Bedford, Mass., a corporation of Massachusetts, and one-half to General Motors Corporation, Detroit, Mich., a corporation of Delaware Application August 30, 1945, Serial No. 613,514

6 Claims. (Cl. 308—201)

This invention relates to separators or retainers for the rolling elements of antifriction bearings and comprises all of the features of novelty herein disclosed.

An object of the invention is to provide an improved separator or retainer which will yieldably permit non-uniform movements of rolling elements in an antifriction bearing.

Another object is to provide a separator particularly adapted for high speed bearings and which will accommodate individual changes in the rates of movements of rolling elements in such bearings.

A further object is to provide an annular separator of composite construction that is reinforced against radial deformation and which may resiliently yield through portions of its circumference to accommodate individual changes in the rates of movements of rolling elements in an antifriction bearing.

To these ends and also to improve generally upon devices of this character, the invention consists in the various matters hereinafter described and claimed. In its broader aspects, the invention is not necessarily limited to the specific structure selected for illustrative purposes in the accompanying drawings in which Figure 1 is a fragmentary perspective view of this invention;

In antifriction bearings which support non-uniformly distributed loads and wherein separator-guided rolling elements roll in engagement with opposed raceways, the rolling elements tend to individually change their rates of advance while travelling through the loaded zone of the bearing. Heretofore, separators were constructed to keep the rolling elements uniformly spaced irrespective of distribution of bearing loads so that the rolling elements could not vary their rates of movement with respect to each other. In non-uniformly loaded bearings wherein the rolling elements were prevented from varying their rates of movement, there was detrimental heating and wear caused by a slight sliding of the rolling elements on the raceways and by a frictional binding of these rolling elements against the separator. When non-uniformly loaded bearings are operated at high speeds, this separator-restricted movement of the rolling elements often results in separator failure and in bearing breakdown.

Figure 2:
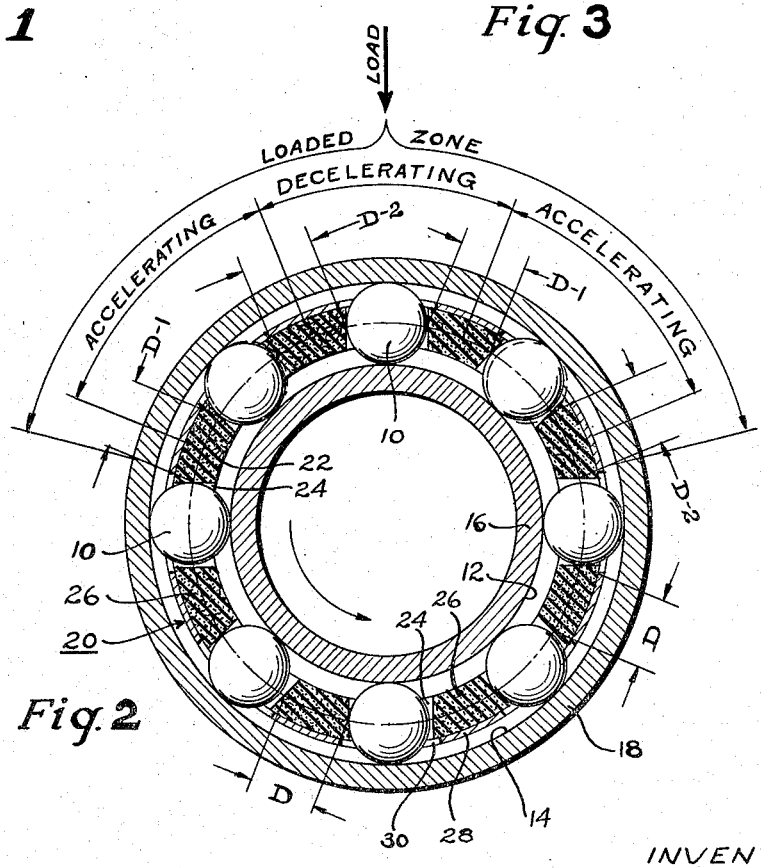
Figure 2 is a section view showing the operation of the invention.

The change in rate of rolling element movement through the loaded zone of a bearing is illustrated in somewhat exaggerated form in Figure 2 wherein rolling elements 10, herein illustrated as balls, roll upon raceways 12 and 14 formed in race rings 16 and 18, these rolling elements being yieldably guided by my improved separator 20. The usual non-uniform loading of an antifriction bearing produces a loaded zone, as shown, and the load-carrying portions of the race rings are slightly distorted causing the rolling elements 10 to accelerate in the first and last portions of the loaded zone and to decelerate while rolling through the intermediate portions of the more heavily loaded zone. This acceleration and deceleration is very rapid in a high speed bearing, and my separator is locally yieldable between the rolling elements to permit their individual changes of movement and thereby prevent damage to the separator and/or the rolling elements. For purpose of comparison, the dotted positions of the rolling elements in the loaded zone indicate the uniformly spaced positions which these rolling elements must assume when guided by a prior type of rigid separator.

Figure 1:
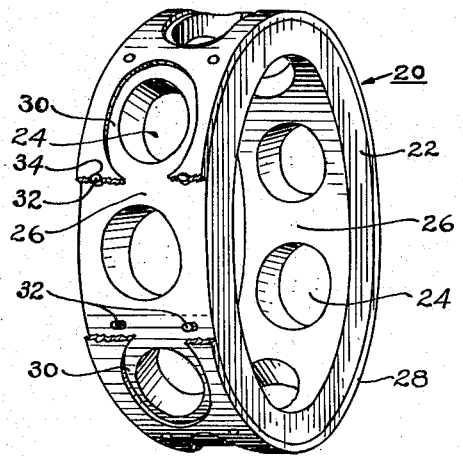

In the embodiment of Figures 1 and 2, our separator 20 has an inner annular member 22 provided with a series of generally radially disposed and circumferentially spaced through apertures 24 for receiving the rolling elements 10. Resilient wall portions 26 between these apertures individually yield under control of the rolling elements to allow these rolling elements to individually change their rates of true rolling movements through the loaded zone of the antifriction bearing. We preferably mold the annular member 22 from an inherently resilient rubberlike material which may deform in all directions. When the separator is not being subjected to stress, the apertures 24 are preferably uniformly spaced and the wall portions 26 have a thickness D along the pitch line of the rolling elements, and these apertures are of a size to closely receive the rolling elements without binding against their peripheries. During bearing operation, as illustrated, the wall portion 26 in front of an accelerating rolling element resiliently compresses to the thickness D—1 along the rolling-element-pitch-line, and the wall portion behind this rolling element resiliently stretches to the thickness D—2 along this pitch line.

A reinforcing ring 28 peripherally confines the annular member 22 and prevents radial expansion of the separator into interfering relation with the outer race ring 18 under influence of the centrifugal forces set up when the antifriction bearing is operated at high speed. This ring 28 has a series of through apertures 30 corresponding in number with and generally aligning with the apertures 24. Each aperture 30, which is larger than the cooperating aperture 24, is preferably elongated circumferentially of the separator and surrounds the aperture 24 in sufficiently spaced relation so that a rolling element in passing through the loaded zone may locally deform the annular member 22 without engaging and being restricted in its movement by the edges of the apertures 30. The reinforcing ring 28 is demountably secured to the annular member 22 with the apertures 24 and 30 in predetermined alignment as by interfitting portions on the annular member and on the ring, herein shown as protrusions 32 of the annular member interfitting holes 34 in the ring 28.

Figure 3:
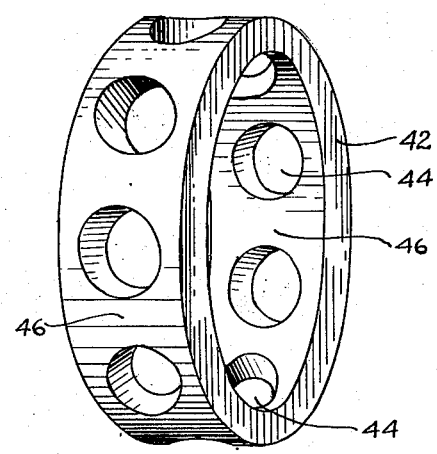
Figure 3 is another embodiment of the invention.

Another embodiment of this invention is shown in Figure 3 wherein our separator consists of an integral annular member 42 composed of inherently resilient material provided with circumferentially spaced rolling element-receiving apertures 44 and generally constructed similar to the annular member 22. During the rolling element travel through the loaded zone of an antifriction bearing, wall portions 46 between adjacent apertures 44 will resiliently and individually deform to allow for individual changes in the rates of rolling element movements.

We claim:

1. An antifriction bearing separator comprising an inherently resilient annular member having circumferentially spaced apertures, and means restricting radial expansion of said member.

2. In an antifriction bearing having a plurality of rolling elements, an annular member resiliently yieldable throughout its entirety and provided with circumferentially spaced rolling element-receiving apertures, and non-resilient reinforcing means for restricting the radial expansion of said member.

3. In an antifriction bearing having a plurality of rolling elements, an inherently resilient annular member that resiliently tends to maintain a predetermined annular shape, said member having circumferentially spaced rolling element receiving apertures, and a ring-shaped nonresilient member restricting the radial expansion of said annular member.

4. In an antifriction bearing having a plurality of rolling elements, an inherently resilient annular member having circumferentially spaced rolling element receiving apertures therethrough, and a reinforcing ring peripherally embracing and preventing radial expansion of said member.

5. An antifriction bearing separator comprising a resilient annular member having a series of circumferentially spaced rolling element-receiving apertures, a reinforcing ring peripherally embracing said member and preventing radial expansion of the separator, and the reinforcing ring having through apertures respectively surrounding and spaced from the rolling element-receiving apertures.

6. In an antifriction bearing having a plurality of rolling elements, a resilient annular member having circumferentially spaced rolling element receiving apertures, a reinforcing ring peripherally encompassing said member and having apertures respectively surrounding said rolling element receiving apertures in spaced relation to the rolling element receiving apertures, and interlocking means preventing relative rotation of the reinforcing ring and of said member.

KARL P. GOODWIN.
LELAND D. COBB.

REFERENCES CITED

The following references are of record in the file of this patent:

UNITED STATES PATENTS

| Number | Name | Date |
|---|---|---|
| 824,819 | Riebe | July 3, 1906 |
| 951,847 | Seubert | Mar. 15, 1910 |
| 1,996,841 | Stevens | Apr. 9, 1935 |
| 2,061,999 | Foss | Nov. 24, 1936 |

FOREIGN PATENTS

| Number | Country | Date |
|---|---|---|
| 182,562 | Germany | Apr. 15, 1907 |